3,278,087
HOT-DRINK DISPENSING MACHINE
Roland Stasse, 23 Ter Av. du Chateau,
Bourg-la-Reine, France
Filed July 1, 1964, Ser. No. 379,661
1 Claim. (Cl. 222—146)

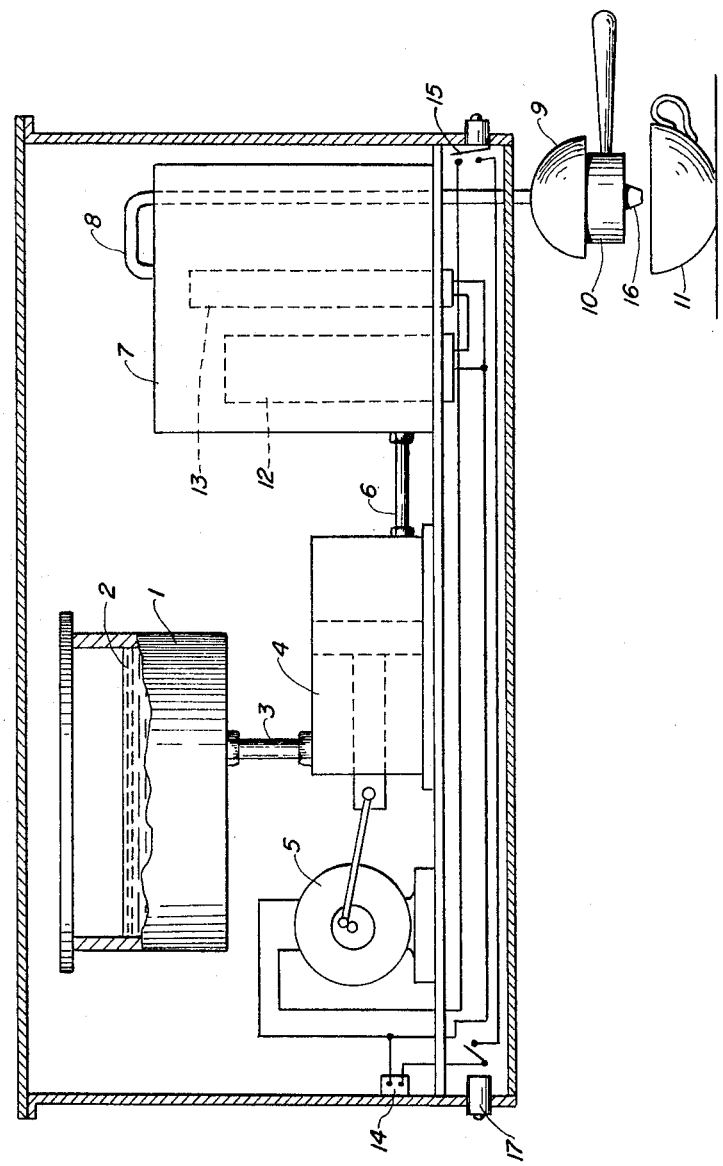

This invention relates in general to machines for manufacturing and dispensing hot drinks or beverages and has specific reference to beverage generators incorporated in such machines, especially coffee-making machines.

In hitherto known machines of this type the water pressure is raised by a pump inserted in the hot-water line, that is, between the water heater and the filter or percolator, for example the filter in the case of a coffee-making machine.

This arrangement is attended by serious drawbacks. On the one hand the pump packings and gaskets are subjected to rapid wear and tear due to the high temperature of the water circulating therein, and on the other hand its body and valves become rapidly blocked.

Finally, as the generator is disposed in a circuit constantly under pressure (water head, townwater main connection, etc.) and subjected to the pump pressure, on the other hand, safety devices are necessary in order to avoid overpressures.

The hot-drink machine according to this invention, which comprises a cold-water supply, a generator water heater adapted to raise the temperature of this water, a motor-driven pump for raising the water pressure to a pressure consistent with its proper use in a hot-water dispensing device, is characterized basically in that said pump is included in the cold-water circuit upstream of the aforesaid generator.

The single figure of the attached drawing illustrates diagrammatically by way of example a typical embodiment of a device according to the principles of this invention. The machine shown in the drawing comprises a cold-water supply or source in the form of a tank 1 containing a reserve of water 2 and connected through an outlet pipe 3 to a pump 4 driven by a motor 5 and connected in turn through a delivery pipe 6 to a hot-water generator 7 adapted to supply hot water through a feed line 8 to the hot-drink dispensing device consisting in this example, of a percolator comprising a filter 9 and a filter carrier 10.

The pump motor 5 is connected to a suitable electrical circuit 14 through a switch 15 of any suitable type (for example a hand operated, or relay-controlled switch, which may be of the snap-action, time-lag or cyclic type).

The generator 7 comprises heating means such as an electrical resistance 12 connected to the electric circuit through switch 17 under the control of a thermostat 13.

To prevent a light steam jet from escaping permanently through the percolator outlet orifice 16 during the time period between two successive infusions, a lightly-loaded valve opening in the direction of the coffee-filter 10 may be mounted in the line 8.

After the generator has been allowed to fill up with cold water and the latter has been heated to its boiling point, switch 15 is actuated to start the motor 5 and thus operate the pump 4 which, by delivering cold water to the generator 7, forces a fraction of the hot water therein to escape under pressure through the orifice 16 of percolator 9, 10.

If ground coffee has been placed beforehand in the filter 10 hot coffee will be collected in the cup 11.

Then, by simply opening the circuit energizing the motor 5 the outflow through orifice 16 will be stopped automatically.

It may be pointed out that in most apparatus designed for delivering hot drinks or beverages the treatment water must be as hot as possible, notably in the case of coffee, where this requirement becomes a must.

It will be readily understood that this requirement is easily met by the machine according to the present invention, as the boiling water flows directly from the generator to the filter and has neither the time nor the possibility of cooling to any appreciable degree.

With the arrangement of this invention it is even possible to take advantage of the conduction heat of pipe 8 which, outside the generator, may be relatively short to pre-heat the filter carrier 9 and maintain at an elevated temperature so that very hot coffee infusions can be dispensed even if a certain time elapses between two successive infusions It may be noted that in case of failure of the thermostat 13 the boiling water will escape naturally through the orifice 16, since the generator is of the free-flow type.

Of course, various modifications may be made to the specific embodiment shown and described herein without departing from the spirit and scope of the invention as set forth in the appended claim.

What I claim is:

A machine for dispensing a hot beverage produced by the action of hot water upon a substance, comprising a source of cold water under relatively low pressure; a hot-water generator having a closed receptacle and water-heating means in said receptacle; a pump connected between said source and said hot-water receptacle for feeding water thereto at an elevated pressure; an outlet pipe extending from an upper portion of said receptacle; a container for said substance disposed along said outlet pipe for contacting said substance with hot water at an elevated pressure in said container; beverage-outlet means connected to said receptacle for discharging the beverage formed by the action of the water on said substance therein, said beverage-outlet means connecting said pipe to the atmosphere; and an intermittently operable motor connected to said pump for driving same to dispense said beverage.

References Cited by the Examiner

UNITED STATES PATENTS

| | | |
|---|---|---|
| 1,603,130 | 10/1926 | McDuffie. |
| 2,755,733 | 7/1956 | Arosio et al. |
| 2,853,208 | 9/1958 | Paulding _____ 222—146 X |
| 2,868,109 | 1/1959 | Davis. |

RAPHAEL M. LUPO, *Primary Examiner.*